US006287402B2

(12) United States Patent
Soldner

(10) Patent No.: US 6,287,402 B2
(45) Date of Patent: *Sep. 11, 2001

(54) PROCESS FOR THE PRODUCTION AND INSTALLATION OF A PANE OF GLASS WITH A FRAME, IN PARTICULAR ON A VEHICLE PART

(75) Inventor: Karl Soldner, Weissach im Tal (DE)

(73) Assignee: Richard Fritz GmbH & Co. KG, Besigheim (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,056

(22) Filed: Jun. 28, 1999

Related U.S. Application Data

(62) Division of application No. 08/687,436, filed as application No. PCT/EP95/00303 on Jan. 28, 1995, now Pat. No. 5,935,356.

(30) Foreign Application Priority Data

Feb. 11, 1994 (DE) .................................................. 44 04 348

(51) Int. Cl.$^7$ ................................. B60J 1/00; E06B 3/54
(52) U.S. Cl. .............................. 156/71; 156/108; 52/208; 296/93; 296/201
(58) Field of Search ....................... 156/108, 71; 296/93, 296/201, 216, 218; 52/208

(56) References Cited

U.S. PATENT DOCUMENTS 4,621,469 * 11/1986 Kruschwitz ............................. 52/208
4,894,972   1/1990 Endoh et al. .

FOREIGN PATENT DOCUMENTS

| 34 26 355 | 2/1985 | (DE) . |
| 36 04 364 | 8/1986 | (DE) . |
| 0 576 179 | 12/1993 | (EP) . |
| 0 576 180 | 12/1993 | (EP) . |
| 2 076 045 | 5/1981 | (GB) . |
| 2 093 106 | 2/1982 | (GB) . |
| 58-20511 | 2/1983 | (JP) . |
| 6-48172 | 2/1994 | (JP) . |

* cited by examiner

Primary Examiner—Sam Chuan Yao
(74) Attorney, Agent, or Firm—Foley & Lardner

(57) ABSTRACT

In the processes for the production and installation of a pane of glass with a frame, in particular on a vehicle part, the frame is produced as a plastics molding in the form of a closed ring. In these processes, a first bearing surface for the pane of glass and an adhesive bonding surface for the application of an adhesive are formed integrally on one side of the frame, and a second bearing surface for placing against the vehicle part is formed integrally on one of the other sides of the frame. In addition, either a retaining element running around along the frame or a number of anchoring elements or a second adhesive bonding surface for the application of a second adhesive are formed integrally on one of the other side of the frame. The frame may first of all be connected permanently to the pane of glass using an adhesive and then connected removably or permanently to the vehicle part together with the pane of glass by the retaining element or the anchoring elements or the second adhesive. The frame may also first of all be connected removably or permanently to the vehicle part by the retaining element or the anchoring elements or the second adhesive and then connected permanently to the pane of glass using an adhesive.

18 Claims, 4 Drawing Sheets

PROCESS FOR THE PRODUCTION AND INSTALLATION OF A PANE OF GLASS WITH A FRAME, IN PARTICULAR ON A VEHICLE PART

This application is a divisional of Ser. No. 08/687,436 filed Aug. 12, 1996 now U.S. Pat. No. 5,935,356 which is the national phase application of PCT/EP95/00303 filed Jan. 28, 1995.

BACKGROUND OF THE INVENTION

Panes of glass, especially those of motor vehicles, are often provided with a pane surround or a frame made of plastic which has a certain cross-sectional profile, by means of which the pane is inserted and fixed in a predetermined opening, e.g. an opening in the body. In general, the pane surround or frame also serves at the same time to seal off the pane relative to the adjoining component.

Some pane surrounds of this kind are molded directly on the pane by injection molding after the prior application to the pane of an adhesion promoter to achieve better bonding of the pane of glass to the plastic of the pane surround. This molding-on process takes place in a rigid injection mold in which the pane is accommodated. There are cavities in the interior of the injection mold where the plastic is intended to form the pane surround. The plastic is forced into the injection mold at high pressure to ensure that it reliably fills the cross-sectional profile in all its ramifications.

Such injection molds are of very complicated construction and accordingly are very expensive. For various reasons, these injection molds are subjected to severe wear, making it necessary repeatedly to overhaul at least individual parts and sometimes even the entire mold or to replace the entire mold. This gives rise to further costs for the mold.

The injection mold is composed of steel. For this reason, it is inflexible in relation to the pane of glass. The panes of glass themselves are produced by a thermoforming process because they are often curved in three dimensions. Because of the properties of the glass and the production process for the panes, the panes have considerably higher tolerances as regards their dimensions and their dimensional accuracy than the steel injection mold. If the pane is oversized, particularly as regards before its thickness or in the case of deviations from its nominal shape, the pane is broken either while being clamped in the mold or during the subsequent injection of the plastic. As crumbs of glass, the fragments can have very small dimensions, making it difficult to remove them completely from the injection mold before the next pane is inserted. The very small fragments, in particular, lead to damage to the surface of the injection mold or even to damage of the next pane. However, they can also lead to defects in the pane surround. If the pane is undersized, particularly as regards before its thickness, it is to be expected that the plastic will in part escape through the gap then present between the injection mold and the pane and that outgrowths or "flash" will form. This must be removed subsequently by hand whenever it is visible and impairs the appearance of the pane and its surround. This finishing of the panes is very time consuming, requires careful workers and is accordingly expensive. Moreover, there is also the danger here that the pane of glass and/or its surround will be damaged during the removal of the outgrowths of material by the tools used for removal and that the essentially finished pane will therefore subsequently turn into scrap.

SUMMARY OF THE INVENTION

The present invention specifies processes for the production and installation of a pane of glass with a frame, in particular on vehicle parts, in which the outlay on production and the outlay on assembly is lower than with the conventional processes.

By the present processes, the frame for the pane of glass is produced in a simple manner with a very low outlay and connected in stages both to the pane of glass and to the vehicle part. It is possible to change the sequence of the last-mentioned operations as desired. In all the processes, there is no longer any need for complex compression molds into which the pane of glass has to be inserted as well. Due to the fact that the frame is produced in the absence of the pane of glass, the compression mold itself and the compression operation are completely unaffected by the dimensional and shape accuracy of the pane of glass, thus eliminating all the disadvantages which arise in the production of the frame with the pane of glass inserted in the compression mould.

Further additional sealing can be created for the panes of glass thereby produced and removably installed on the vehicle part.

Further, an additional possibility for sealing between the frame of the pane of glass and the vehicle part can be created. This is advantageous particularly where there is a releasable connection between the frame and the vehicle part, but also protecting the permanent joint between the frame and the vehicle part from the action of atmospheric influences in the other cases as well.

BRIEF DESCRIPTION OF THE DRAWINGS

The invention is explained in greater detail below with reference to a number of exemplary embodiments, illustrated in the drawing, of panes of glass with a frame fully installed on a vehicle part. In the drawing.

DETAILED DESCRIPTION OF THE PREFERRED EMBODIMENTS

Figure 1:
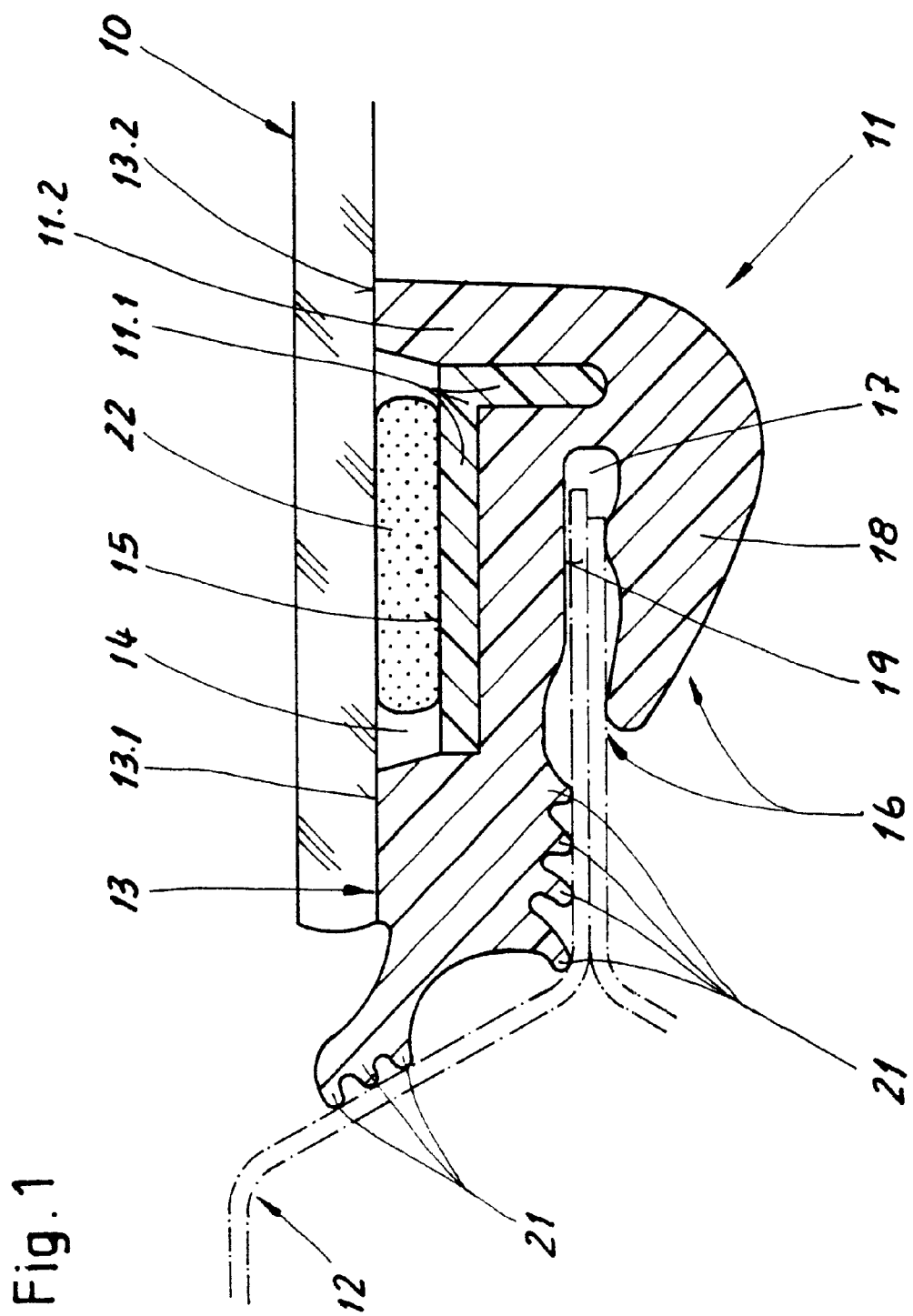
FIG. 1 shows a cross section, shown in part and on an enlarged scale, of a first exemplary embodiment of the pane of glass with the frame, mounted removably on a vehicle part.

In the exemplary embodiment that can be seen from FIG. 1, there is a pane of glass 10 with a frame 11, which is connected to a vehicle part 12 in order to close an opening (not shown in any more detail) at that location.

The frame 11 is produced as a plastics molding. The overall profile of the frame 11 is formed by two profile sections, of which one profile section 11.1 is composed of a plastic of higher dimensional stability and greater rigidity and the other profile section 11.2 is composed of a plastic of lower dimensional stability and higher elasticity, which are connected to one another permanently during the very process of producing them, for which reason the frame 11 is considered below as a single component.

On the side facing the pane of glass 10, the frame 11 has a first bearing surface 13 for the pane of glass 10. This bearing surface is divided into the two sections 13.1 and 13.2 by a groove-shaped recess 14. The bottom of the recess 14, which runs parallel to the bearing surface 13, serves as an adhesive bonding surface 15 of the frame 11.

On that side of the frame which faces away from the pane of glass 10, there is a retaining element 16 which is formed by a retaining groove 17 running around along the frame and by a retaining strip 18 which partially overlaps the retaining groove 17. In the state of rest of the frame 11, the retaining groove 17 has a clear width which is less than the thickness of that section of the vehicle part 12 which is subsequently to be accommodated in it. That side wall of the retaining groove 17 which faces away from the pane of glass 10 is simultaneously designed as a second bearing surface 19 of the frame 11, serving to allow the frame 11 to bear on the vehicle part 12.

In the region of the lateral edge of the pane of glass 10, sealing elements in the form of sealing ribs 21 running round along the frame are formed integrally on the two sides of the frame 11 which face away from the pane of glass, these sealing ribs being divided into two groups. In the relaxed, initial state, the sealing ribs 21 project partially beyond the subsequent outline of the vehicle part 12, so that, in the installed state, they rest against the vehicle part 12 with a certain prestress.

The procedure for the production of the frame 11 with the pane of glass 10 and its installation on the vehicle part 12 is as follows:

The frame 11 is produced as a complete component in the form of a plastics molding. An adhesive 22 is applied to the adhesive bonding surface 15 of the frame 11, an adhesion promoter additionally being applied at least in that area of the surface of the pane of glass 10 which subsequently lies opposite the adhesive bonding surface 15. The pane of glass 10 is laid against the first bearing surface 13 of the frame 11 and connected permanently to the frame 11 by means of the adhesive 22. The frame 11 with the pane of glass 10 is placed against the vehicle part 12, initially by means of the outside of the retaining strip 18. An assembly cord is inserted into the retaining groove 17 beforehand in the customary manner and, after the frame 11 has been placed against the vehicle part 12, this cord is pulled out all the way round from the retaining groove 17, starting from one end, the retaining strip 18 thereby being lifted out past the edge of the vehicle part 12, after which it comes to rest on the outside of the relevant area of the surface of the vehicle part 12 by virtue of its inherent prestress and hence holds the frame 11 with the pane of glass 10 firmly against the vehicle part 12. To the extent to which the retaining strip 18 is pulled away from underneath the vehicle part 12, the second bearing surface 19 of the frame 11 comes to rest against the vehicle part 12. In the process, the sealing ribs 21 are also pressed more strongly against the vehicle part 12 and they are thus deformed elastically at this time, if not already deformed, and come to rest in a sealing manner against the vehicle part 12 with the resultant prestressing force.

Following the production of the frame 11, the mounting of the pane of glass 10 and its installation on the vehicle part 12 can also take place as follows:

Following the production of the frame 11 as a complete component, the frame 11 is placed against the vehicle part 12 without the pane of glass 10 and placed against the vehicle part 12 by means of the second bearing surface 19 in the known manner by pulling out the assembly cord and connected removably to the said vehicle part. The adhesive 22 is applied to the adhesive bonding surface 15 and the adhesion promoters required for good adhesion are further applied to the relevant surfaces. The pane of glass 10 is then placed against the first bearing surface 13 and connected permanently to the frame 11 by means of the adhesive 22.

Figure 2:
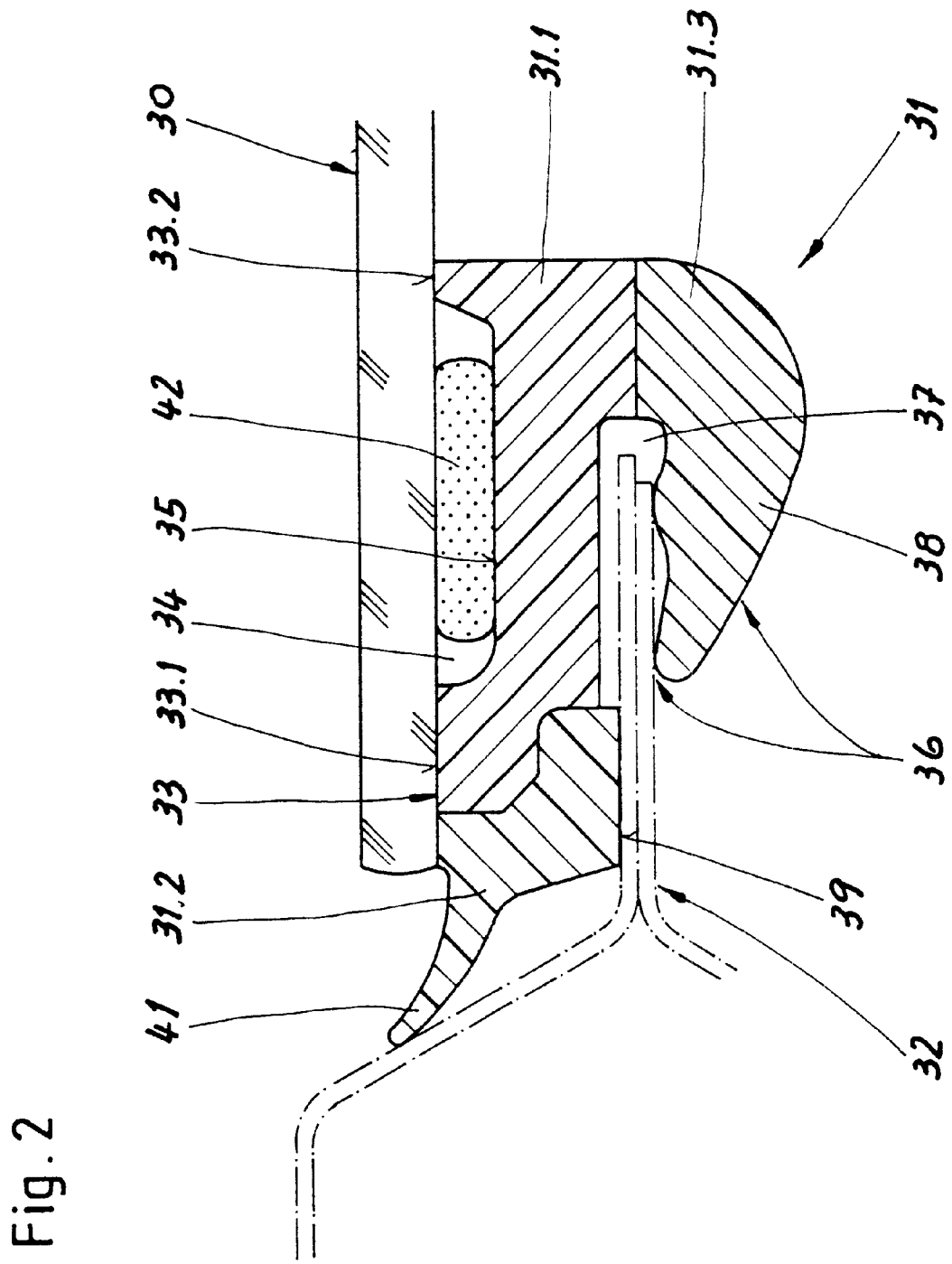
FIG. 2 shows a cross section, shown in part and on an enlarged scale, of a second exemplary embodiment of the pane of glass with the frame, mounted removably on a vehicle part.

In the exemplary embodiment that can be seen from FIG. 2, the pane of glass 30 with the frame 31 is present and these are connected removably to the vehicle part 32.

The overall profile of the frame 31 is formed by three profile sections, of which one profile section 31.1 is again composed of a plastic of higher dimensional stability and greater rigidity and the other two profile sections 31.2 and 31.3 are composed of a plastic of lower dimensional stability and higher elasticity.

The first bearing surface 33 for the pane of glass 30 is again formed integrally on the side facing the pane of glass 30. It is divided into the two sections 33.1 and 33.2 by the recess 34. The bottom of the recess 34 again serves as an adhesive bonding surface 35.

On the side facing away from the pane of glass 30 is the retaining element 36, which is formed by the encircling retaining groove 37 and the retaining strip 38 which partially overlaps the latter. The retaining strip 38 here largely corresponds to profile section 31.3 of the frame 31. In the case of the frame 31, the second bearing surface 39 is situated outside the retaining groove 37. That side wall of the latter which faces the retaining strip 38 is set back by a certain amount relative to the plane of alignment with the second bearing surface 39. In the relaxed, initial state, those sections of the retaining strip 38 which subsequently rest against the vehicle part 32 are at a distance from the plane of alignment with the second bearing surface 39 which is less than the thickness of that section of the vehicle part 32 which subsequently rests against them, with the result that the retaining strip 38 subsequently rests against the vehicle part 32 with a certain prestress.

A sealing element in the form of a single encircling sealing lip 41 is formed integrally in the region of the lateral edge of the pane of glass 30. In the relaxed, initial state, this sealing lip projects partially into the space subsequently occupied by the vehicle part 32, so that, after installation, it rests against the vehicle part 32 with a certain prestress.

The mounting and installation of the pane of glass 30 are performed in a similar manner to that in the case of the pane of glass 10. An adhesive 42 is applied to the adhesive bonding surface 35 and, insofar as required for good adhesion, an adhesion promoter is applied beforehand to one and/or the other surface. The pane of glass 30 is placed against the first bearing surface 33 and connected permanently to the frame 31 by means of the adhesive 42. The frame 31 with the pane of glass 30 is placed against the vehicle part 32 by means of the second bearing surface 39 and connected removably to the vehicle part 32 by means of the retaining device 36 by pulling out the assembly cord inserted into the retaining groove 37.

In this embodiment too, it is possible, after the production of the frame 31, for the mounting and installation operations to be performed in a different sequence to that described above in the case of the pane of glass 10 and the frame 11.

Figure 3:
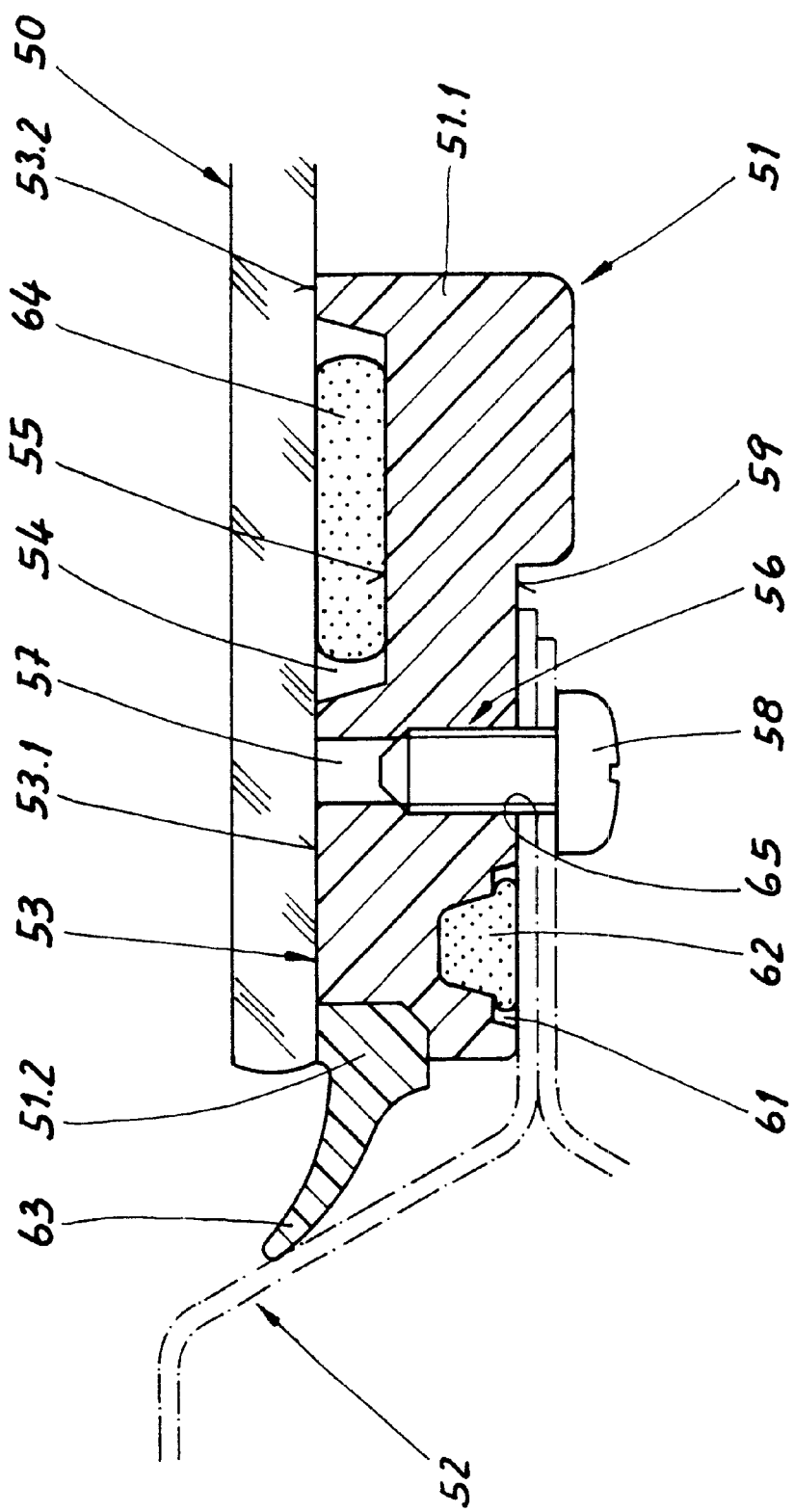
FIG. 3 shows a cross section, shown in part and on an enlarged scale, of a third exemplary embodiment of the pane of glass with the frame, mounted removably on a vehicle part.

In the exemplary embodiment that can be seen from FIG. 3, the pane of glass 50 with the frame 51 is present and is connected removably to the vehicle part 52.

As a constructional unit, the frame 51 comprises the profile sections 51.1 and 51.2, which, as before, have different properties.

Formed integrally on the frame 51, on the side facing the pane of glass 50, is the first bearing surface 53, which is divided into two sections 53.1 and 53.2 by the recess 54. The bottom of the recess 54 forms the adhesive bonding surface 55.

Formed integrally on that side of the frame 51 which faces away from the pane of glass 50 are a plurality of anchoring elements 56 which are designed as cylindrical blind holes or through holes 57. Interacting with these as further anchoring elements are self-tapping flat-head screws 58.

Formed integrally on the frame 51, in the region of the anchoring elements 56, on the side facing away from the pane of glass 50, is the second bearing surface 59 for laying against the vehicle part 52. Formed integrally as a sealing surface 61 in the region of the second bearing surface 59 is a groove which runs around along the frame and into which a sealing element 62 in the form of a closed ring is inserted. Depending on the cross-sectional shape of the groove and/or of the sealing element 62, this sealing element can be inserted removably in the groove or be connected permanently to the sealing surface 61 by means of an adhesive. The sealing element 62 is expediently produced from a porous or, preferably, a cellular elastomer.

Formed integrally on the frame 51, in the region of the lateral edge of the pane of glass 50, is a further sealing element in the form of a single encircling sealing lip 63 which, as in the case of frame 31, projects partially, in the unstressed state of rest, into the space subsequently occupied by the vehicle part 52. The sealing lip 63 and its root largely correspond to the profile section 51.2.

In the process of assembly and installation, the adhesion promoters required for good adhesion is first of all applied to the frame 51 and/or to the pane of glass 50 in the region of the adhesive bonding surface 55, and the adhesive 64 is applied to the adhesive bonding surface 55. The pane of glass 50 is placed against the first bearing surface 53 and connected permanently to the frame 51 by means of the adhesive 64. The sealing element 62 is mounted removably or permanently on the frame 51 at the sealing surface 61. The frame 51 with the pane of glass 50 is placed against the vehicle part 52 by means of its second bearing surface 59. The flat-head screws 58 are inserted through the through holes 65, which are present in the vehicle part 52 and are in alignment with the through holes 57 in the frame 51, and screwed into the through holes 57 serving as anchoring elements 56 and tightened. During this process, both the sealing element 62 and the sealing lip 63 come to rest against the vehicle part 52 with a certain prestress.

Using the same basic elements, the assembly and installation of the frame 51 and the pane of glass 50 can also be performed by placing the frame 51 against the vehicle part 52 by means of the sealing element 62, which has been mounted on said frame beforehand, and anchoring it or fastening it on said vehicle part by means of the anchoring elements 56 and the screws 58. Any adhesion promoters are then applied to the relevant surface areas and the adhesive 64 is applied to the adhesive bonding surface 55, and the pane of glass 50 is then placed against the first bearing surface 53 and connected permanently to the frame 51 by means of the adhesive 64.

Figure 4:
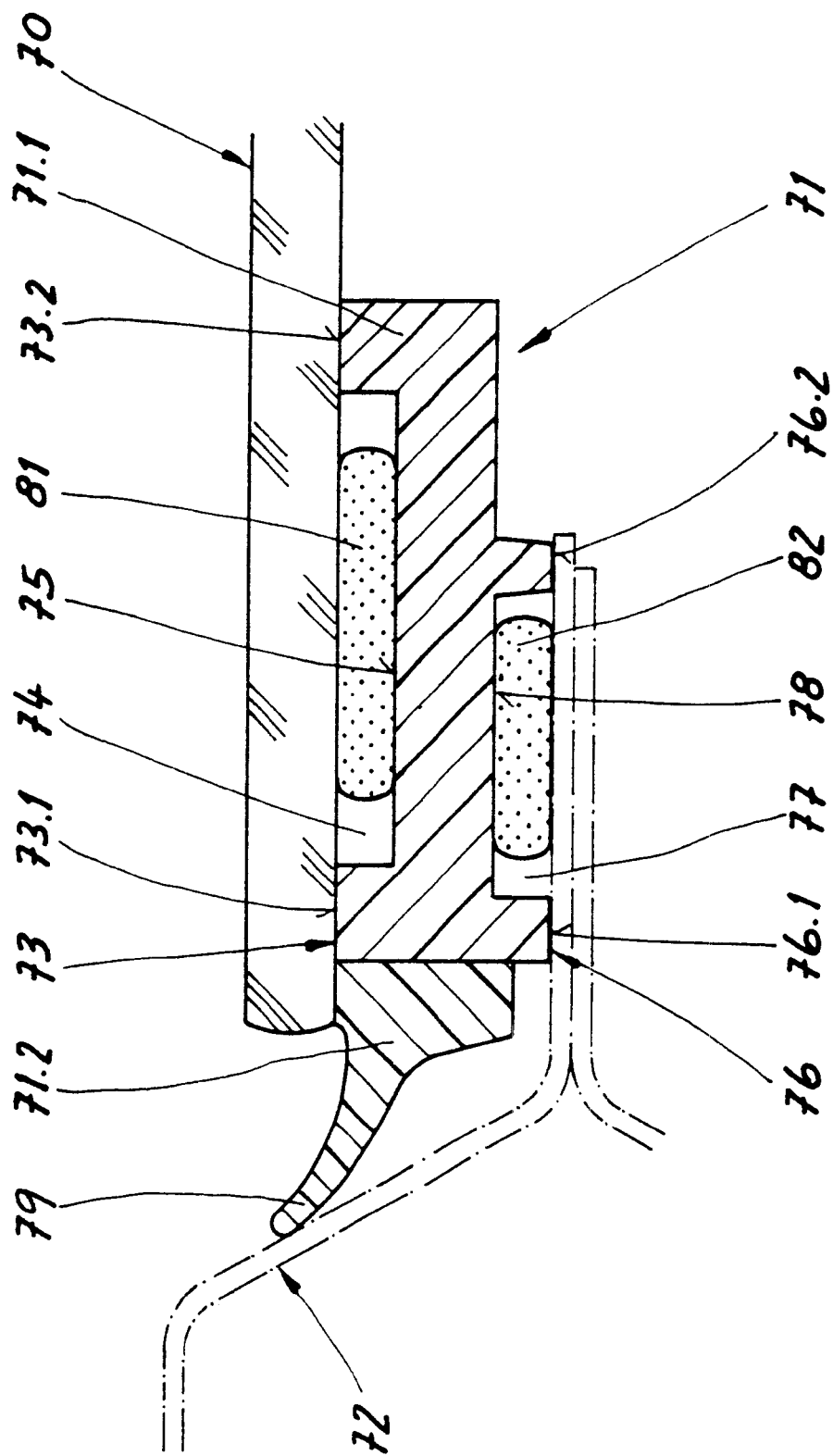
FIG. 4 shows a cross section, shown in part and on an enlarged scale, of a fourth exemplary embodiment of the pane of glass with the frame, mounted removably on a vehicle part.

In the exemplary embodiment that can be seen from FIG. 4, the pane of glass 70 with the frame 71 is present and is connected permanently to the vehicle part 72.

The overall profile of the frame 71 is formed by the profile sections 71.1 and 71.2, the materials of which have different properties.

On that side of the frame 71 which faces the pane of glass 70 is the first bearing surface 73, which is divided into the two sections 73.1 and 73.2 by the recess 74. The bottom of the recess 74 forms the first adhesive bonding surface 75 of the frame 71.

Formed integrally on that side of the frame 71 which faces away from the pane of glass 70 is the second bearing surface 76, which is divided into the two sections 76.1 and 76.2 by a recess 77. The bottom of the recess 77, which runs parallel to the second bearing surface 76, forms a second adhesive bonding surface 78 of the frame 71.

An encircling sealing lip 79 is formed integrally as a sealing element in the region of the lateral edge of the pane of glass 70. The sealing lip 79 and its root largely correspond to the profile part 71.2.

In the process of the assembly and installation of the pane of glass 70 and of the frame 71, the first adhesive 81 is applied to the first adhesive bonding surface 75 together with the requisite adhesion promoter. The pane of glass 70 is placed against the first bearing surface 73 and connected permanently to the frame 71 by means of the first adhesive 81. A second adhesive 82, if required together with adhesion promoters, is applied to the second adhesive bonding surface 78. The frame 71 with the pane of glass 70 is placed against the vehicle part 72 by means of its second bearing surface 76 and connected permanently to it by means of the second adhesive 82.

In this exemplary embodiment too, a different sequence of assembly and of the installation operations is possible, it being possible for the second adhesive 82 to be applied to the second adhesive bonding surface 78 on the frame 71 first and for the frame 71 to be placed against the vehicle part 72 first and connected permanently to it and only then for the first adhesive 81 to be applied to the first adhesive bonding surface 75 and the pane of glass 70 placed against the first bearing surface 73 and connected permanently to the frame 71 by means of the first adhesive 81.

What is claimed is:

1. A process of producing and installing a pane of glass, comprising:

providing a plastic molding frame having a closed ring configuration, the frame having first, second, and third profile sections, the second and third profile sections being attached to the first profile section, the first profile section having a higher dimensional stability and greater rigidity than the second and third profile sections;

forming a first bearing surface that only contacts an underside surface of the pane of glass on one side of the frame, wherein the first profile section has the first bearing surface and a recess that divides the first bearing surface into a first glass bearing section and a second glass bearing section, an adhesive bonding surface being formed on a bottom of the recess;

forming a retaining element by forming a retaining groove along the frame and a retaining strip that partially overlaps the retaining groove, the retaining element being formed on a side other than the side where the first bearing surface is formed;

forming a second bearing surface that contacts a vehicle part on a side of the frame other than the side where the first bearing surface is formed;

applying a sufficient amount of adhesive to one of the adhesive bonding surface of the recess and an area of a surface of the pane of glass disposed adjacent to the adhesive bonding surface, to cause the adhesive to contact both the glass and the adhesive bonding surface when the glass is placed against the first bearing surface;

connecting the pane of the glass to the frame with the adhesive by placing the pane of glass against the first bearing surface of the frame so that the glass is placed over and across the recess, contacting the first and second glass bearing sections of the first bearing surface;

placing the second bearing surface of the frame against the vehicle part; and movably connecting the frame and pane of glass to the vehicle part with the retaining element.

2. A process according to claim 1, wherein the second bearing surface is formed on the second profile section.

3. A process according to claim 1, wherein the retaining strip is formed on the third profile section and the groove is formed between the retaining strip and first profile section, an portion of the vehicle part being positioned in the groove.

4. A process according to claim 1, wherein the second profile section has a third glass bearing section contiguous with the first glass bearing section, the third glass bearing section contacting the glass when the glass is placed against the first bearing surface of the frame.

5. A process according to claim 1, wherein the frame further includes an encircling sealing lip formed on one side of thereof, the sealing lip engaging a portion of the vehicle part.

6. A process according to claim 5, wherein the sealing lip is formed on the second profile section.

7. A process according to claim 2, wherein the retaining strip is formed on the third profile section and the groove is formed between the retaining strip and first profile section, an portion of the vehicle part being positioned in the groove.

8. A process according to claim 7, wherein the second profile section has a third glass bearing section contiguous with the first glass bearing section and opposite the second bearing section, the third glass bearing section contacting the glass when the glass is placed against the first bearing surface of the frame.

9. A process according to claim 8, wherein the frame further includes an encircling sealing lip formed on the second profile section, the sealing lip engaging a portion of the vehicle part.

10. A process of producing and installing a pane of glass, comprising:

providing a plastic molding frame having a closed ring configuration, the frame having first, second, and third profile sections, the second and third profile sections being attached to the first profile section, which has a higher dimensional stability and greater rigidity than the second and third profile sections, frame having a first bearing surface that only contacts an underside surface the glass and a second bearing surface that contacts a vehicle part, the second bearing surface being formed on a side other than the side where the first bearing surface is formed, wherein the first profile section has the first bearing surface and a recess that divides the first bearing surface into a first glass bearing section and a second glass bearing section, the recess having an adhesive bonding surface on a bottom thereof, the frame further having a groove and a retaining strip that partially overlaps the retaining groove, which groove and the retaining strip forming a retaining element along the frame, the retaining element being formed on a side other than the side where the first bearing surface is formed;

applying a sufficient amount of adhesive to one of the adhesive bonding surface of the recess and an area of a surface of the pane of glass disposed adjacent to the adhesive bonding surface, to cause the adhesive to contact both the glass and the adhesive bonding surface when the glass is placed against the first bearing surface;

connecting the pane of glass to the frame with the adhesive by placing the pane of glass against the first bearing surface of the frame so that the glass is placed over and across the recess, contacting the first and second glass bearing sections of the first bearing surface;

placing the second bearing surface of the frame against the vehicle part; and movably connecting the frame and pane of glass to the vehicle part with the retaining element.

11. A process according to claim 10, wherein the second bearing surface is formed on the second profile section.

12. A process according to claim 10, wherein the retaining strip is formed on the third profile section and the groove is formed between the retaining strip and first profile section, an portion of the vehicle part being positioned in the groove.

13. A process according to claim 10, wherein the second profile section has a third glass bearing section contiguous with the first glass bearing section, the third glass bearing section contacting the glass when the glass is placed against the first bearing surface of the frame.

14. A process according to claim 10, wherein the frame further includes an encircling sealing lip formed on one side of thereof, the sealing lip engaging a portion of the vehicle part.

15. A process according to claim 14, wherein the sealing lip is formed on the second profile section.

16. A process according to claim 11, wherein the retaining strip is formed on the third profile section and the groove is formed between the retaining strip and first profile section, an portion of the vehicle part being positioned in the groove.

17. A process according to claim 16, wherein the second profile section has a third glass bearing section contiguous with the first glass bearing section and opposite the second bearing section, the third glass bearing section contacting the glass when the glass is placed against the first bearing surface of the frame.

18. A process according to claim 17, wherein the frame further includes an encircling sealing lip formed on the second profile section, the sealing lip engaging a portion of the vehicle part.

* * * * *